Fig. 5-a
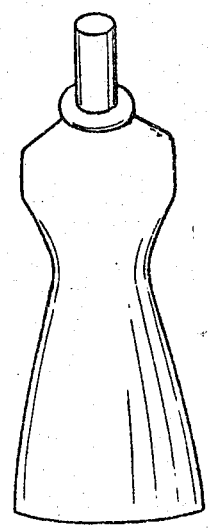
Fig. 5-b
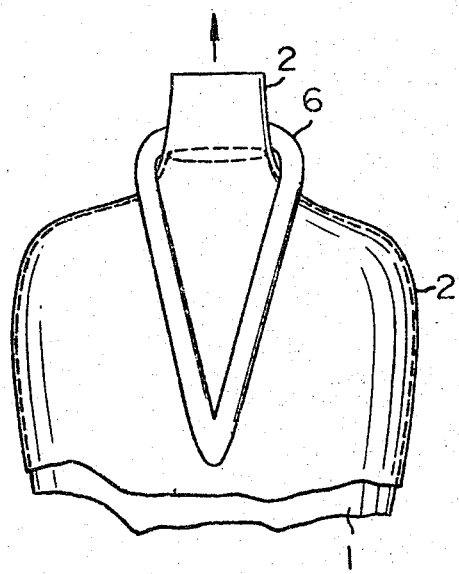
Fig. 5-c
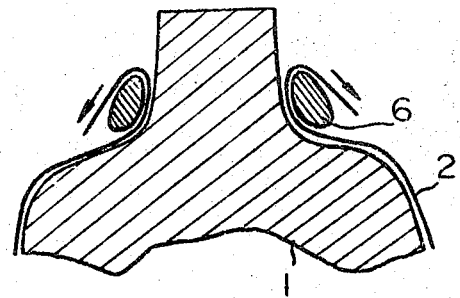

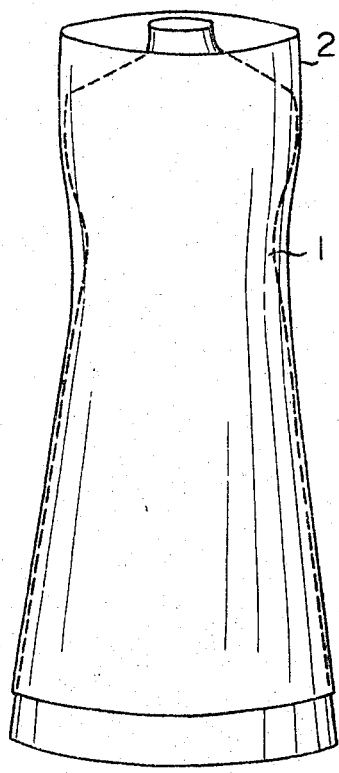
Fig. 4-a
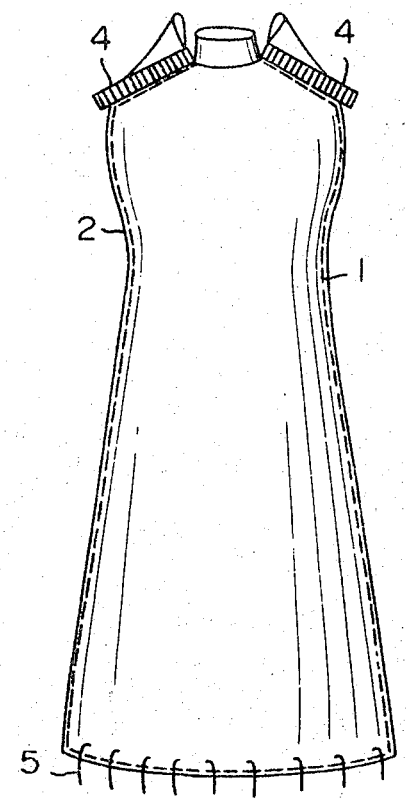
Fig. 4-b

Fig. 6-a
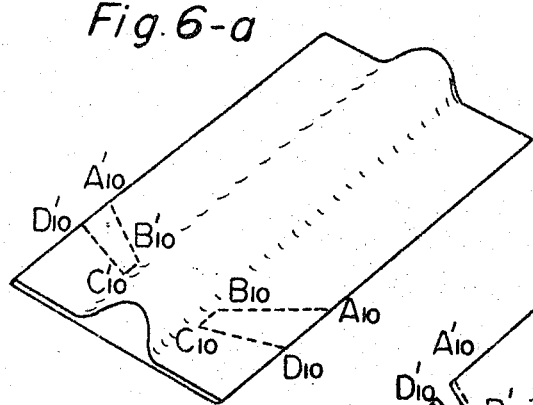
Fig. 6-b
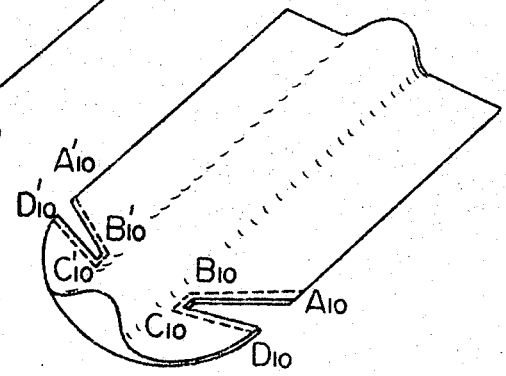
Fig. 6-c
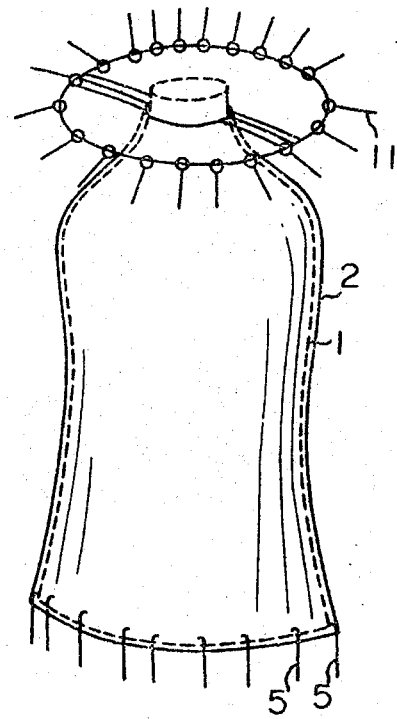
Fig. 6-d
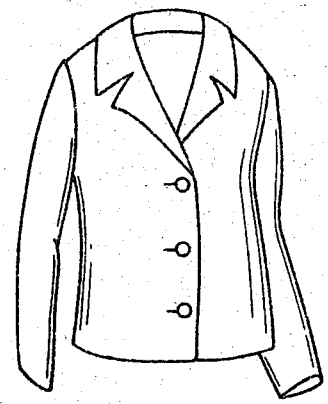

Fig. 7-a
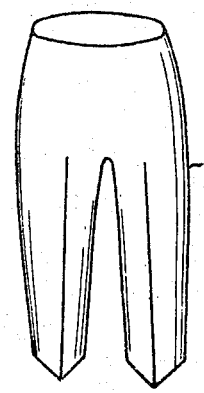
Fig. 7-b
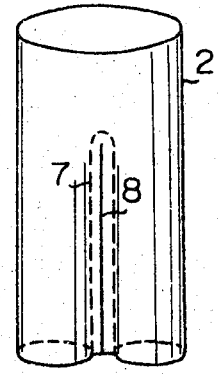
Fig. 7-c
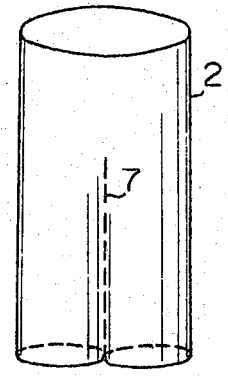
Fig. 7-d-1
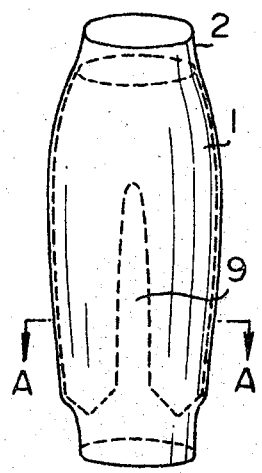
Fig. 7-d-2
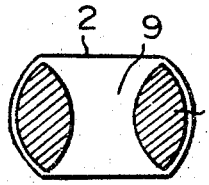
Fig. 7-d-3
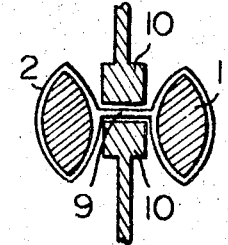
Fig. 7-e
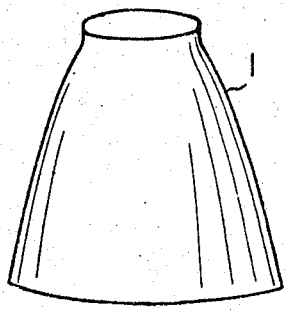

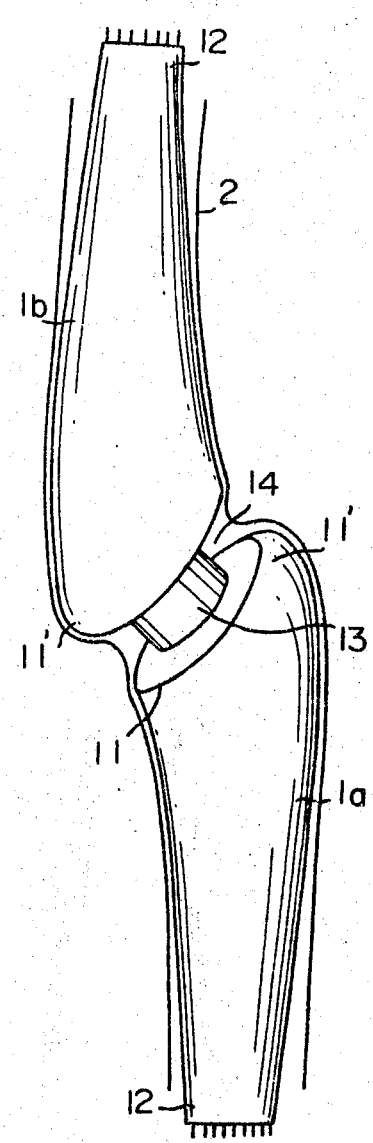
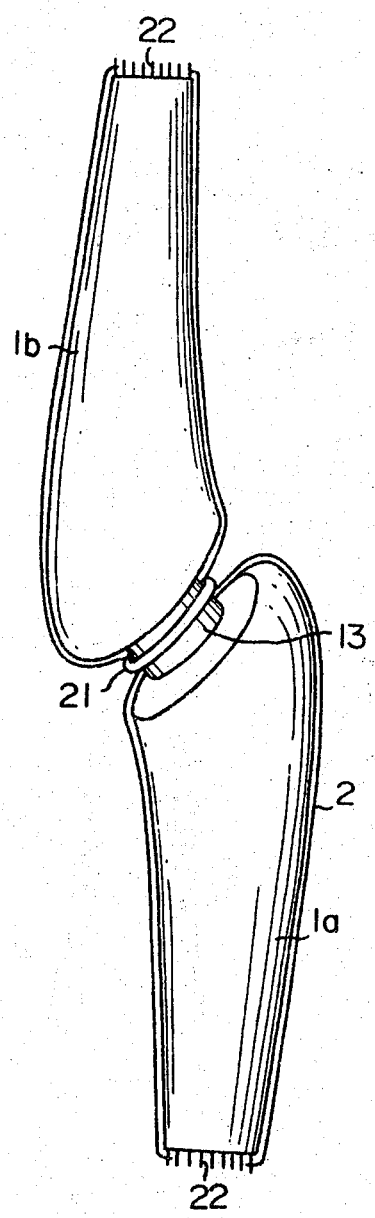
Fig. 8-a    Fig. 8-b

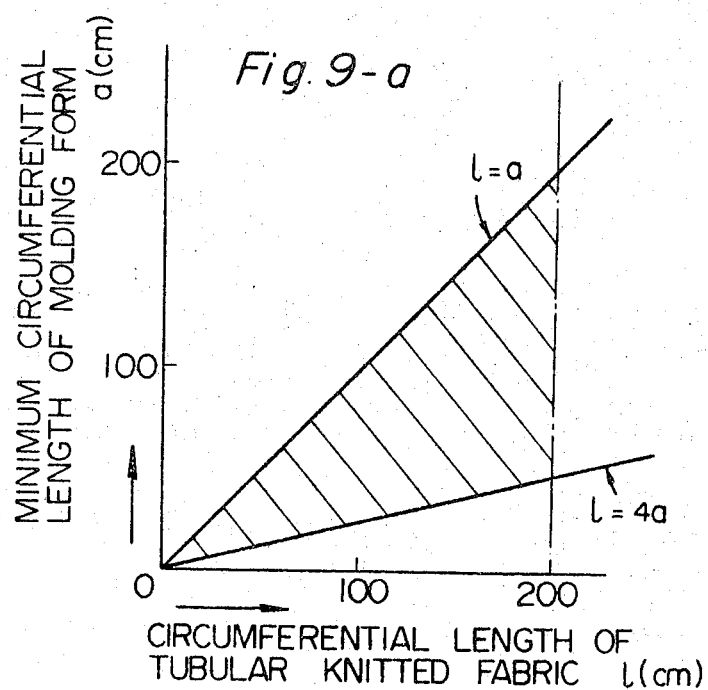
Fig. 9-a
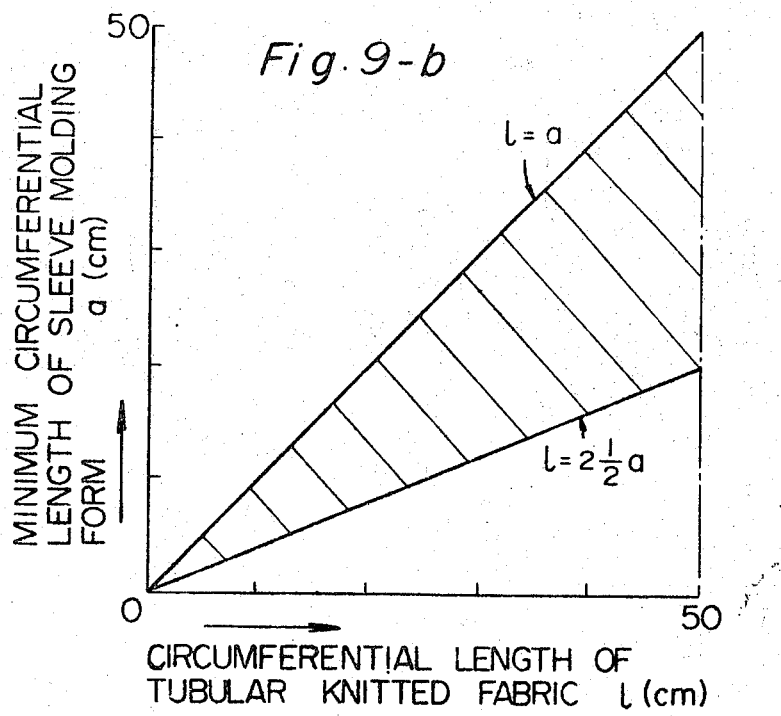
Fig. 9-b

Fig. 10-a-2
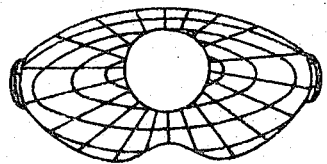
Fig. 10-a-1
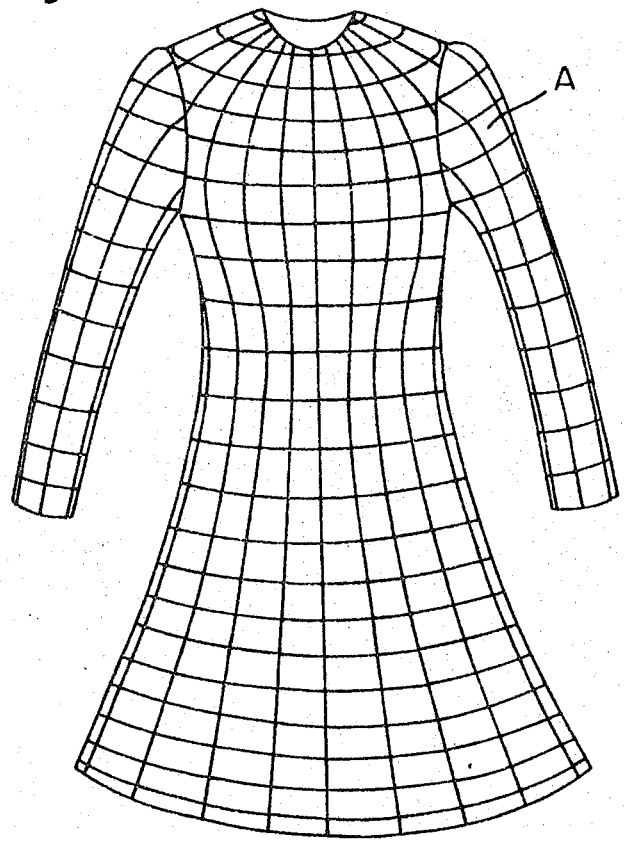

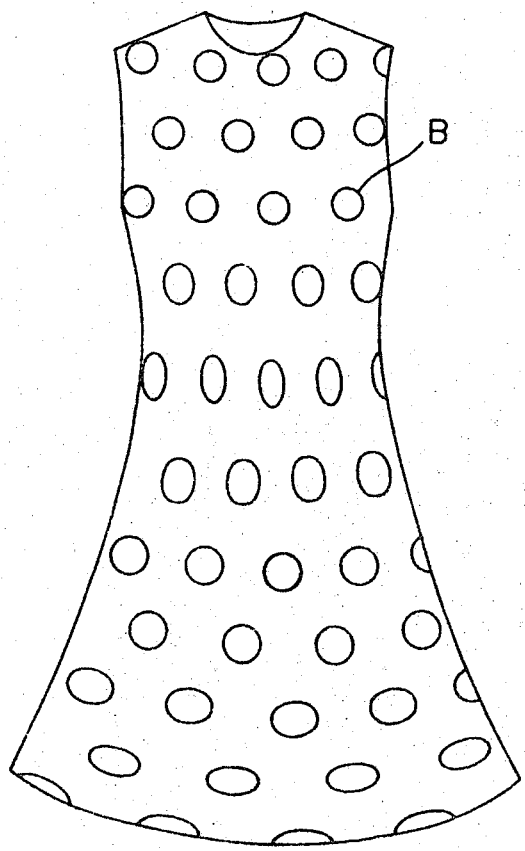
Fig. 10-b

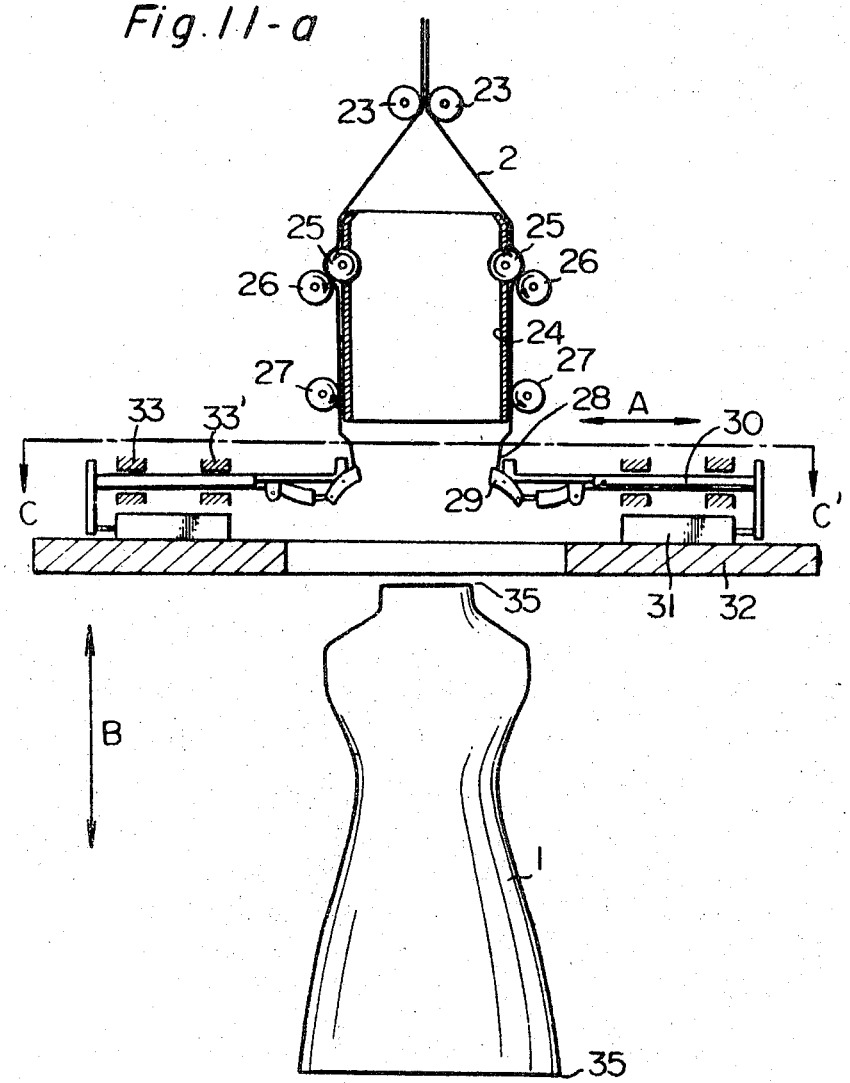
Fig.11-a

Fig. 11-b
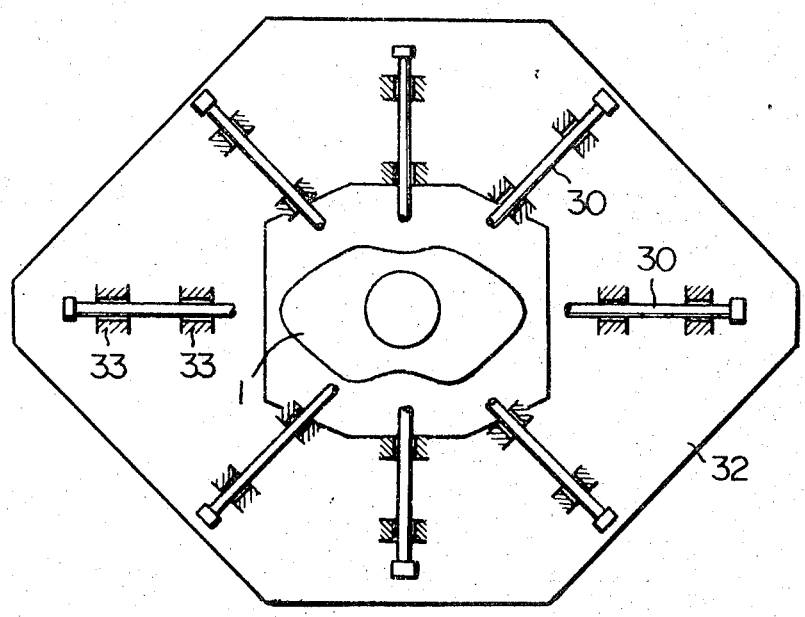
Fig. 12
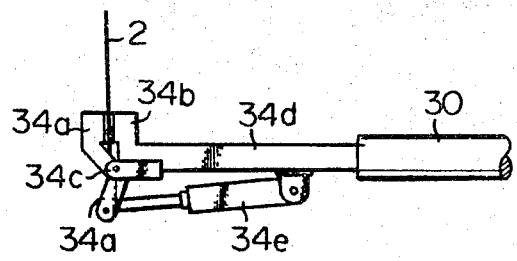

United States Patent Office 3,819,638
Patented June 25, 1974

3,819,638
METHOD OF MAKING GARMENTS OF KNITTED FABRICS
Kiyoshi Ogawa, Hirakata, and Seiji Koyama and Takehiko Michihara, Ibaraki, Japan, assignors to Teijin Limited, Osaka, Japan
Filed Oct. 18, 1971, Ser. No. 189,918
Claims priority, application Japan, Oct. 10, 1970, 45/92,212
Int. Cl. B29c 17/02
U.S. Cl. 264—292
3 Claims

ABSTRACT OF THE DISCLOSURE

A method of making a garment which comprises mounting on a molding form so as to cover its side circumferential surface, a tubular knitted fabric opened at both ends, at least 30% of which is composed of a thermoplastic synthetic fiber, exerting a tension on the knitted fabric in the directions of its open ends to thereby decrease the dimensions of the tubular knitted fabric in the direction of diameter until it fits to the side circumferential surface of the molding form, heat-setting the tubular knitted fabric under the application of such tension, and thereafter removing the molded fabric from the molding form.

---

This invention relates to a method of making a garment conforming well to a body pattern, the garment being made of a knitted fabric with little or no need for such steps as cutting or sewing which are complicated and costly.

More specifically, the invention relates to a method of making garment by a process comprising mounting on a molding form so as to cover its side circumferential surface, a tubular knitted fabric opened at both ends, at least 30% of which is composed of a thermoplastic synthetic fiber, preferably a tubular knitted fabric in which the circumferential length at its transverse section is longer than the minimum circumferential length of the molding form and it is not more than 4 times the minimum circumferential length of the molding form, preferably subjecting the tubular knitted fabric to a dart treatment before or after the mounting of the fabric on the molding form so as to adjust that part of the knitted fabric which covers the curved surface of the molding form from the neck to the shoulder to the molding form, applying a tension to the knitted fabric in the direction of the open ends of the knitted fabric mounted on the molding form thereby shrinking the tubular knitted fabric until it fits to the side circumferential surface of the molding pattern in the direction of the tubular diameter, heat-setting the knitted fabric under such tension, and then removing the knitted fabric from the molding form.

The conventional method of making garments of knitted fabrics requires such steps as cutting or sewing which are complicated and costly. In order to form a three-dimensional curved surface suited well to a given body pattern, such as the bosom or waist, it has been the practice to make a model pattern from the prototype, place the model pattern on a knitted fabric, cutting the fabric, and sewing the cut pieces together; or make a flat pattern by draping, and perform the above-mentioned operations using it as a model pattern. Such a conventional method requires a high level of technique and is time-consuming, and also disadvantages such as cut loss cannot be avoided.

Another method of making garments from a knitted fabric comprises increasing or decreasing the number of stitches during the knitting step, thereby form pieces of knitted fabric in the form of the cut pieces as mentioned above, and sewing or knitting them together. This method is complicated in the knitting operation itself and such knitted fabric is outside the scope of the tubular knitted fabric used as the starting material in the present invention.

It has now been found that garments as final product can be made with little or no need for such complicated steps of the conventional methods.

It has now been found that when a tension is applied to a tubular knitted fabric opened at both ends in the direction of the axis of the tubular fabric utilizing not the heat-shrinkability of the filaments themselves which constitute the fabric but the stretchability of the knitted fabric ascribable to the knitted texture of the fabric, the fabric shrinks in the direction of its tubular diameter, and therefore, it is possible to decrease the dimensions of the tubular knitted fabric so that it fits to the side circumferential surface of the molding form, and that when the knitted fabric is heat-set under such tension conditions and then the knitted fabric is removed from the molding form, a garment or its main part can be made with little or no need for the complicated and disadvantageous steps.

It has also been found that the garment so made retains filaments of uniform quality throughout the garment and has superior feel and appearance, unlike the case of fitting the fabric to the molding form by heat-setting utilizing the heat-shrinkability of the filaments themselves, such as filaments having latent crimps.

It has also been found that the knitted fabric develops a unique and interesting pattern which is formed when the knit texture of the knitted fabric is fitted by tension to the curved surface of the molding form, and which is not seen in the conventional products.

It has also been found that since the fitting of the knitted fabric to the molding form is performed by the stretchability of the fabric ascribable to the knit texture itself of the knitted fabric, there is no restriction on the heat-shrinkability of the filaments that constitute the fabric, and also thermoplastic synthetic fibers which can be heat-set can be used in accordance with the present invention.

It has been found that if, for example, a one-piece dress is made from a knitted fabric in accordance with the present invention, all or most of the 18 darts or so which are needed in the conventional method can be omitted, and the fittability of the garment to the wearer can be markedly improved over the conventional products, and that the number of sewing steps, which is about 73 in the conventional method, has been reduced to about 33 steps with the time needed to make the product being reduced to half, and that the cut loss occurring in the conventional method is reduced about 30–40% for each garment, and the garments produced are superior with respect to quality and cost of production.

Accordingly, an object of the present invention is to provide a method of producing garments of knitted fabric well suited to a given body pattern by omitting all or most of the complicated and costly steps such as cutting or sewing.

Many other objects and advantages of the present invention will become apparent from the following description.

The material used in the present invention is a tubular knitted fabric opened at both ends, at least 30% of which is composed of thermoplastic synthetic fibers. Examples of such thermoplastic synthetic fibers include polyester fibers, polyamide fibers, poyacrylonitrile fibers, and polyvinyl chloride fibers. The knitted fabric may consist of at least one kind of such thermoplastic synthetic fibers, or a mixture of at least one kind of such thermoplastic synthetic fibers with other fibers, for example, natural and/or regenerated fibers. The only requirement as to the composition of the material is that at least 30% of the knitted fabric consists of a thermoplastic synthetic fiber. The form and properties of the yarn used for producing the knitted fabric may be varied as desired. If the content of the thermoplastic synthetic fiber is less than 30% by weight, the effect of heat-setting is poor.

The knitted fabric is used in the form of a hollow cylinder having both ends opened. The tubular form may be produced at the time of producing the knitted fabric, or by sewing both edge portions of a flat knitted fabric.

Then the tubular knitted fabric of the above description is mounted on a desired molding form so as to cover its side circumferential surfaces, and a tension is applied to the fabric by a proper means in the direction of the ends of the knitted fabric, for example by pulling both open ends to directions opposite to each other, the knitted fabric is decreased in size in the direction of the tubular diameter owing to the inherent properties of the knit texture itself. The tension at this time is such as to fit the knitted fabric to the curved surfaces consisting of concavities and convexities of the molding form, and when the knitted fabric is heat-set (after heating, cooling positively or spontaneously) under the above-mentioned tension conditions without releasing the tension, the thermoplastic synthetic fiber in the knitted fabric is set to a form fitting to the molding form. The knitted fabric is removed from the molding form thereby producing a garment or its main part.

Several embodiments of the garments in accordance with the present invention will be described with reference to the accompanying drawings in which.

Figure 1:
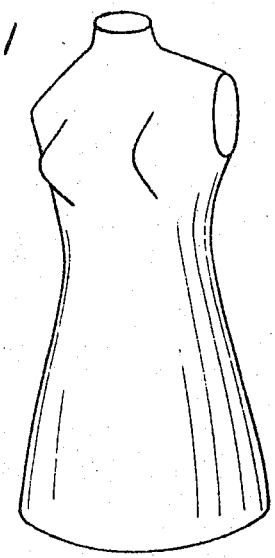
FIG. 1 is a perspective view of one example of the molding form for making a one-piece dress shown in FIG. 2.
Figure 2:
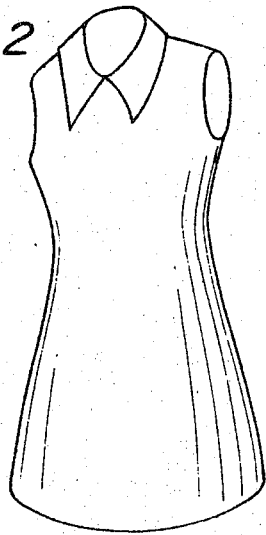
Figures 1, 3:
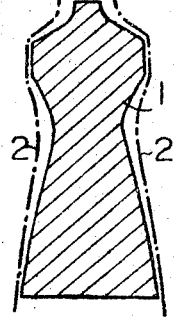
FIG. 3 is a schematic flow-sheet illustrating one example of making a one-piece dress in accordance with the present invention using this molding form.
Figure 3:
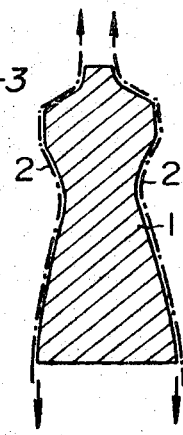
Figures 3, 4, 5:
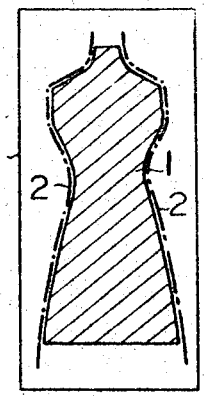
Figures 2, 3:
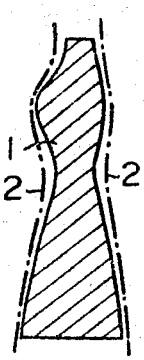
Figures 3, 4:
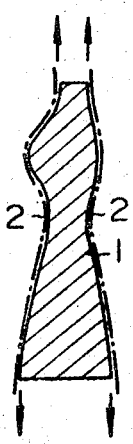

The molding form is made in a size which allows fullness of the body, overlap, seam allowance, etc. As shown in FIGS. 3–1 and 3–2, a tubular knitted fabric opened at both ends, at least 30% by weight of which is composed of a thermoplastic synthetic fiber, is mounted on the molding form so as to cover the side circumferential surface of the molding form. Then both open ends of the fabric are pulled in directions opposite to each other (the directions of arrows in FIG. 3–3 and FIG. 3–4) to exert a tension on the fabric in the directions of the open ends of the fabric. This results in the decrease in size of the tubular knitted fabric in the direction of the tubular diameter owing to the knit texture. Therefore, those portions which have not fitted to the molding form 1, for instance those covering the neck, shoulders, upper bosom, or waist fit to the molding form 1 as shown in FIG. 3–3 and FIG. 3–4. Under this tension the knitted fabric is placed in a heat-set chamber 3 in FIG. 3–5, and is heated by wet or dry heat which does not damage the material, such as hot air or steam, or by an infrared heating means, followed by positive or spontaneous cooling, thereby heat-setting it on the molding form. The heating may be performed by introducing hot steam into a molding form made of a heat-resistant material such as a metal. If desired, the cooling can be carried out in the same way.

Various means for applying a tension to the tubular knitted fabric mounted on the molding form in the directions of the open ends of the fabric can be employed in the invention. Specifically, the application of tension may be carried out by pulling both ends of the fabric in directions opposite to each other, or by pulling one end of the fabric while fixing the other.

FIGS. 4–a and 4–b show one example of this invention, especially dart treatment of that part of the knitted fabric 2 which covers a curved surface ranging from the neck to the shoulders of the molding form in order to ensure the fitting of the fabric to that part of the molding form. After this treatment, the bottom end of the knitted fabric is pulled downwards to fix the fabric on molding form 1.

The term "dart treatment" means the introduction of a dart and its subsequent fixation. This may be accomplished by any desired means such as ordinary dart stitching or holding of a part corresponding to the dart with a clip. The dart treatment is effected on both right and left side on the shoulder line in ordinary dressmaking. The shape and number of darts may however be changed according to the design of the garment.

The tubular knitted fabric 2 is mounted on the molding form 1 so as to cover the side circumferential surface of the molding form as shown in FIG. 4–a. As shown in FIG. 4–b, the darts are held with clips 4, and the bottom of the knitted fabric is pulled downwards by a number of hooks 5 thereby ensure the fitting of the knitted fabric more to the curved surface ranging from the neck to the shoulder of the molding form. It is thus possible to pull only the bottom end of the knitted fabric and to exert the desired tension on the knitted fabric.

The heat-set knitted fabric can be removed from the molding form by cutting a part of the fabric which corresponds to the open part of the garment or the seaming portion. For instance, in the case of a one-piece dress having an opening at the front center line, the fabric can be removed by cutting the front center line. If the garment is to have an opening at the shoulder, the shoulder line of the knitted fabric is cut to remove it from the molding form. If it is desired to provide an opening at the back, the back center line is cut. The garment, if desired, is subjected to simple finishing to give a product of superior quality.

In accordance with another embodiment of the invention, a garment with a collar can be provided. For example, as shown in FIGS. 5–a and 5b (perspective view) an annular hold member 6' having the desired neck opening shape is mounted on the molding form. One end of the tubular knitted fabric 2' mounted on the molding form 1 is pulled in the direction of the arrow, and the other end (not shown) is pulled in the opposite direction. The tubular knitted fabric is then heat-set under this tension, and then a suitable part of portion 2' pulled upwardly of the molding form, for example back, neck or throat portion, is cut open and folded back to form a collar. The hold member should preferably be made of metal. If desired, the molding form is made of a metal capable of becoming magnetic, and the hold member is made of a magnet.

Alternatively, as shown in FIG. 5–c (sectional view), a rolled collar may be made by changing the direction of pulling the neck portion as shown by the arrow.

According to other embodiments, garments with a front opening can be produced as shown in FIGS. 6–a, 6–b, 6–c, and 6–d. The details will be specifically given in the examples which appear later in the specification.

The garments according to the present invention include not only those for covering the upper half of the body or the entire body, such as upper garments, overcoats, sweaters, blouses, one-piece dresses, jumpers, or waist coats, but also those for covering the bottom half of the body, such as slacks, trousers, or skirts.

FIG. 7–a shows one example of a molding form 1 for making slacks in perspective view. A tubular knitted fabric 2 is mounted on the molding form so as to cover the side circumferential surface of the molding form. At this time, the fabric 2 is so placed, as shown in FIG. 7–b, that its outside is turned inside, and its inside appears on the surface. The parts of the fabric which correspond to the inside of the slacks are sewn together with the front and back in a U-shape as shown by the dotted line 7 in the drawing. Then, it is cut open at the line 8 to make a slacks-like product. The slacks-like product is turned inside out, and mounted on the molding form 1 shown in FIG 7–a. A tension is applied to the product in the directions of its open ends to fit the fabric to the side circumferential surface of the molding form. It is then heat-set under this tension, and removed from the molding form. If desired, it is subjected to simple finishing to make slacks.

Alternatively, as shown in FIG. 7–c, the back and front portions of the slacks are sewn together at the inside center (broken line 7 in the drawing) with the outside of the tubular knitted fabric appearing on the surface, and then the fabric is mounted on the molding form 1. It is then molded in the same way and then cut open at the part shown by 7 in the drawing. The cut portion is subjected to post-treatment to obtain slacks.

As shown in FIG. 7–d–1 (schematic perspective view) and FIG. 7–d–2 (sectional view taken along the line A–A' of FIG. 7–d–1), the knitted fabric is mounted on the molding form 1 so as to cover its side circumferential surface, and a tension is exerted on the fabric 2 in the direction of its open ends to decrease the size of the fabric until it fits to the molding form 1. As shown in FIG. 7–d–3 (sectional view taken along the line A–A'), the knitted fabric at the front and back of the slacks is set for example by pushing it with a heated pressure 10 at the space 9 between the leg portions of the slacks. The molding of the slacks along the leg portions is thus accomplished. The inside 9 of the molded fabric is then cut open, and subjected to necessary post-treatment to make slacks.

FIG. 7–e is a perspective view showing one example of a molding form for making a skirt. The tubular knitted fabric is mounted on the molding form 1 so as to cover its side circumferential surface, and a tension is exerted on the fabric in the direction of the open ends of the fabric to decrease the size of the fabric until it fits to the side circumferential surface of the molding form 1. The fabric is then heat-set under this tension condition, and removed from the molding form 1. If desired, it is subjected to simple finishing to make a skirt.

In order to make a garment with sleeves, the main part of the garment is produced by the procedure mentioned above, and sleeves are separately produced in the same way using a molding form for production of sleeves. Subsequent attaching of the sleeves to the main part of the garment gives the desired garment with sleeves. It will be readily understood that in the case of producing sleeveless garments such as "no-sleeve" garments or waist coats, the above-mentioned main part of the garment can be a product itself.

The production of sleeves in accordance with the present invention will be described with reference to the accompanying drawings.

As the seamline of the sleeves is about 10% longer than that of the armhole of the body because of the fullness of the arm, the stitching of sleeves to the armhole is performed after adjusting the length of the seam line by ease-threads at a part 2–3 mm. inside of the seam allowance of the sleeves, followed by ironing and easing. Since the amount of fullness of the arms differs according to directions, the amount of ease must naturally be changed according to place. Furthermore, since the seam allowance part becomes a gather by tacking, the sleeve stitching requires a high level of technique and is time-consuming. Consequently, it has been difficult to produce garments efficiently.

As the sleeves in accordance with the present invention are made by squeezing a tubular knitted fabric at the connecting part of a connected sleeve-making molding form (1a, 1b) in which the sleeve-attaching joint parts have been eased (see FIG. 8–a), they are already eased. Furthermore, as the seam allowance for sleeve attachment is flat, it is very simple to attach the sleeves. The fitting of the tubular knitted fabric to the molding form is due to the stretchability of the knitted fabric. Since a tension on the respective parts of the knitted fabric during stretching of the fabric is relatively uniform, the individual yarns of the resulting sleeves have equal properties at the respective parts, and the resulting sleeves have uniform quality and feel and appearance.

FIG. 8–a shows the mounting of a tubular knitted fabric 2 opened at both ends (sectional view so as to permit a good look at the sleeve molding form) on the sleeve mold form (shown three-dimensionally) composed of two sleeve mold forms 1a and 1ab.

The sleeve molding form used consists of two sleeve molding forms 1a and 1b joined to each other with a distance of at least 1 cm. at the joint part 11 while allowing a cavity 14 as shown in FIG. 8–a. The fabric is eased at the joint part 11' allowing the fullness of the movement of the arms, and seam allowance. These two sleeve molding forms are joined by a suitable means such as screwing or fitting, and are separable from each other. At the joint part 13, the tubular knitted fabric 2 is tied with an openable ring or cord 21 (FIG. 8–b). A tension is exerted on the fabric by pulling it in the directions of the open ends until the diameter of the tubular knitted fabric is reduced to the minimum diameter of the sleeve molding form, and the fabric is fitted to the molding form. Then, the fabric is held by pins 22 as shown in FIG. 8–b at both ends, and heat-set in this state to the shape of the sleeve. By changing the shape of the molding form, various sleeves such as tight sleeves, shirt sleeves, or puff sleeves can be made.

The molded knitted fabric is cut at the joint part 13, and the mold form 1a is separated from the molding form 1b. The molded fabric is pulled out of each molding form. These sleeves, after having been subjected to ordinary finishing, have a similar appearance to ordinary sleeves and beautiful silhouette.

In the making of garments of the invention, the circumferential length of the transverse section of the tubular knitted fabric may be varied according to the shape of the molding form. It can however be any size which can assure the fitting of the fabric to the molding form according to the degree of decrease in size of the fabric due to the knit texture of the fabric used upon application of a tension, and is properly chosen according to the knitted fabrics and molding forms to be used. Generally, in the production of garments which cover the upper half of the body or the entire body such as upper garments, overcoats, sweaters, blouses, one-piece dresses, jumpers, or waist coats, it is preferred that the circumferential length $l$ of tubular knitted fabrics should be longer than the minimum circumferential length $a$ (usually, the length around the neck) of the molding form, and not more than 4 times the minimum circumferential length. Usually, it is not more than 200 cm. This preferred range is shown in FIG. 9–a by the hatched portion. In the case of garments which cover the bottom half of the body such as slacks or skirts, it is preferred that the circumferential length of tubular knitted fabric should be longer than the minimum circumferential length of the molding form (usually, the length around the waist) and not more than the minimum circumferential length. When sleeve molding forms are used, the circumferential length of the transverse section of the knitted fabric should preferably be longer than the minimum circumferential length of the sleeve molding form (usually, the length around the cuff), and not more than 2 and a half times the minimum circumferential length. Usually, it is not more than 50 cm. This preferred range is shown by the hatching in FIG. 9–b.

The garments of knitted fabrics according to the present invention develop a unique pattern not seen in conventional garments produced by the conventional technique including cutting and sewing steps, and have little or no darts or sewn parts as compared with the conventional garments. The presence of such unique pattern distinguishes the garments of the invention from other garments.

FIGS. 10–a–1, 10–a–2, and 10–b schematically show one example of a one-piece dress of the invention. FIG. 10–a–2 is a front view of the one-piece dress; FIG. 10–

2–a, its plan (seen from above the neck); and FIG. 10–b, a front view of another example of a one-piece dress of the invention.

As shown in FIGS. 10–a–1, 10–a–2, and 10–b, the one-piece dress of the invention has an interesting pattern in which dots or checks vary at the bosom, waist, and bottom parts as a result of the enlargement or decrease of the knit texture that has been caused by fitting the fabric to the molding form.

Now, one example of the apparatus for mounting a knitted fabric on the molding form in the production of the garments of the invention will be described below.

FIG. 11–a is a side cross-sectional view of the apparatus, and FIG. 11b, its plan view taken along the line c–c'. FIG. 12 is a partial, side elevation of one example of a hold mechanism for holding the edge portions of the tubular knitted fabric.

Referring to FIGS. 11–a and 11–b, tubular knitted fabric 2 is fed to the outer peripheral surface of a tubular member 24 via a pair of feed rollers 23. The tubular member 24 is provided with rotating rollers 25 at its peripheral surface, and adapted to convey the knitted fabric 2 continuously (downwardly in the drawing) by the rotation of drive rollers 26 which are in contact with the rollers 25. By delivery rollers 27, the tubular knitted fabric 2 is moved on the tubular member 24, and its end 28 is held by a hold member 29. This hold member 29 is freely stretchable in the direction of arrow A by a joint shaft 30 which is connected thereto, for instance by using an air cylinder 31. As shown in FIG. 12, the hold member 29 can be opened so that it can hold the end of the knitted fabric 2 by a fixed nail 34b at the forward end of the shaft 34d and a nail 34a movable with a pin 34c as a fulcrum. The construction of the hold member may be changed as desired as long as it serves its function. The reference numerals 33 and 33' are slide bearings of the stretchable shaft 30.

The knitted fabric whose peripheral edges at the open ends are held in a radial fashion or substantially flat condition is spread to any desired width by controlling the stretchable shaft 30 connected to the hold member. Thereafter, a lift 32 movable up and down in the direction of arrow B is caused to go down to a point just below the lower end 35 of the molding form 1, and then the fabric is cut at a point slightly above the upper end of the fabric. The hold member is then disengaged. As a result, the knitted fabric 2 can be automatically mounted on the molding form so as to cover its side circumferential surface. The lift 32 is then again raised, and the same procedure is repeated using another molding form. It is thus possible to mount knitted fabrics continuously on the molding form.

In the above-mentioned embodiment, means for elevating or dropping the lift 32 is not shown, but any suitable means may be used which includes for instance an actuating means with the provision of guide rails.

In the above-described embodiment, the tubular member 24 is provided above the molding form 1, and the lift 32 is caused to ascend or descend. In an alternative embodiment, a tubular member 24 may be provided below the molding form, and a tubular knitted fabric is conveyed from below.

According to the present invention, an apparatus is provided for mounting a tubular knitted fabric on a molding form so as to cover its side circumferential surface, which comprises a tubular member 24 having a conveying means which permits the passing of a tubular knitted fabric thereover; and a plurality of hold means disposed at positions which permit the holding of the edges of the open ends of the tubular knitted fabric delivered from the tubular member, such hold means being supported radially on a reciprocable stand having an opening larger than the sectional area of the molding form and movable beyond the bottom end of the molding form surrounding the molding form, and being stretchable in the direction of the diameter of the tubular knitted fabric.

The relative positions of the tubular member and the molding form may be turned upside down or set in an oblique relationship. If they are in an upside-down relationship, the term "bottom end of the molding form" refers to the end of the neck portion of the molding form in FIG. 11–a, for example.

The present invention will be further described by the following Examples.

EXAMPLE 1

A dyed yarn consisting of a blend of 45% polyester and 55% cotton (40 count) was knitted into a welt ripple texture, and finished by scouring to form a tubular knitted fabric having a length of 55 cm. and a circumference of 92 cm. The resulting tubular knitted fabric was mounted on a molding form having a neck size of 40 cm., a bust of 96 cm., a high waist of 90 cm., a bottom of 106 cm., and a total length of 55 cm. After mounting, the part not situated along the neck was held with clips at one part of the front center and two parts of the back, so that the tubular knitted fabrics was fitted along the molding form at a part ranging from the shoulder to the neck. By this operation, the tubular knitted fabric mounted on the molding form shrunk by about 5 cm. in the warp direction of the fabric. The bottom end of the fabric was held by a hook, and pulled downwardly to stretch it by about 5 cm. in the warp direction, thereby fitting the tubular knitted fabric close to the molding form.

Then, in this state, the tabular knitted fabric was heat-treated by dry heat at 180° C. for 10 minutes to set the configuration of the knitted fabric, followed by cooling. The fabric was then cut open at the front center line, and removed from the molding form. Then, the fabric was finished by strapping the darts, attaching a neck, facing the armhole, etc. to make a woman's suit opened at the front. The suit had a beautiful silhouette.

EXAMPLE 2

A yarn consisting of a blend of 45% polyester and 55% cotton (40 count) was knitted into a ponti roma texture, and then scoured. The wale direction of the knitted fabric was caused to conform to the longitudinal direction of a tube, a tubular knitted fabric having a circumferential length of 75 cm. was made. The knitted fabric obtained was mounted on a skirt molding form, and stretched in the wale direction and shrunk in the course direction to fit the fabric close to the skirt molding form. The fabric was then heat-set by dry heat at 180° C. for 10 minutes. The molded fabric was cut open at the back center line, and removed from the molding form. It was subjected to a finishing treatment including the attachment of a belt, or a fastener, or bottom binding to make a semi-flared skirt.

EXAMPLE 3

Two false-twisted nylon yarns (20 denier/3 filaments) were doubled to make a yarn (40 denier/6 filaments). This yarn was knitted into a fabric. The fabric was made into a tubular knitted fabric in which the wale direction was caused to conform to the longitudinal direction of the tube. The knitted fabric had a circumferential length ($l$) of 130 cm., and a length of 100 cm. The tubular knitted fabric was mounted on a molding form, and then an annular hold member was placed on the neck portion of the molding form. The tubular knitted fabric was stretched in the wale direction to fit the fabric close to the molding form. In this case, the minimum length (a) around the neck was 40 cm., the waist was 65 cm., and the bottom was 130 cm. In this case, $l = 2.25a$. In this state, the tubular knitted fabric was heat-treated by wet heat at 130° C. for 20 minutes, and the annular hold member was removed. The molded fabric was cut along the back center line, and removed from the molding form. After finishing, a lining of a one-piece dress fitted well to the body was made.

EXAMPLE 4

A false-twisted polyester yarn (150 denier/30 filaments) was knitted into a milano rib texture, scoured, and dyed. The fabric was made into a tubular knitted fabric having a circumference of 96 cm. and a length of 80 cm. in which the wale direction of the knit fabric conformed to the longitudinal direction of the tubular fabric.

The tubular knitted fabric was folded as shown in FIG. 6–a. Specifically, the length between the shoulder point $A_{10}$ of the front part (upper fabric in the drawing) and the shoulder point $A_{10'}$, was made larger than the back part (the bottom fabric in the drawing) by the left and right overlaps, the seam allowance and the front shoulder, and adjusted to 49 cm. As a result, the length between $A_{10}$ and $A_{10'}$, in the bottom fabric was 47 cm. At the portion corresponding to the circumferential length of the neck, the front part (upper fabric) was made larger than the back part (lower fabric) by the right and left overlaps and seam allowance, and the length $B_{10}$–$B_{10'}$ of the upper fabric was adjusted to 26 cm. As a result, the length $B_{10}$–$B_{10'}$, of the lower fabric was 20 cm. In the same way, the tubular knitted fabric was folded so that either at points $C_{10}$–($C_{10'}$) 2 cm. above $B_{10}$–($B_{10'}$) in the longitudinal direction of the tubular knitted fabric or at $C_{10}$–($C_{10'}$) on the upper fabric, the length $C_{10}$–$C_{10'}$ on the upper fabric was 26 cm., and the length $C_{10}$–$C_{10'}$ on the bottom fabric was 20 cm. As shown in FIG. 6–a, $D_{10}(D_{10'})$ was provided so that $B_{10}C_{10}D_{10}$ ($B_{10'}C_{10'}D_{10'}$) was 80°, and the upper and bottom fabrics were sewn together by line $B_{10}C_{10}D_{10}(B_{10'}C_{10'}D_{10'})$. $A_{10}B_{10}(A_{10'}B_{10'})$ corresponded to the shoulder seam of the resulting garment. $B_{10}C_{10}D_{10}(B_{10'}C_{10'}D_{10'})$ served for the purpose of making, a collar, and $B_{10}C_{10}(B_{10'}C_{10'})$ was to be the stand.

As shown in FIG. 6–b, the outside of $$A_{10}B_{10}C_{10}D_{10}(A_{10'}B_{10'}C_{10'}D_{10'})$$

of the tubular knitted fabric was trimmed to provide a seam allowance of 1 cm., and the edge of the upper end of $D_{10}$–$D_{10'}$ was cut in a semi-circular shape. Thereafter, the tubular knitted fabric 2 was turned inside out, and mounted on the molding form 1 as shown in FIG. 6–c. The molding form 1 had a neck circumference of 46 cm., a bust of 96 cm., a high waist of 90 cm., a bottom of 134 cm., and a total length of 55 cm. About 25 cm. of the upper end of the tubular knitted fabric 2 was held at 10 places by hooks 11, and fixed in a condition pulled from the center towards the outside as shown in the drawing as a collar forming part. The edge of the lower end was held by hooks 5 to 20 places. The fabric was pulled downwardly in the warp direction to stretch it about 10 cm. and fit the fabric 2 close to the molding form 1. In this state, the fabric was heat-treated by dry heat at 180° C. for 10 minutes. After cooling, the fabric was cut open at the front center line, and removed from the molding form by releasing the hooks 5 and 11.

After removal, the molded fabric was finished by sewing collar, facing, buttons, or lining, etc. to produce a woman's suit with a beautiful silhouette, as shown in FIG. 6–d.

What we claim is:

1. A method for the production of a garment for covering the upper half of the body, bottom half of the body or the entire body, of knitted fabric, which comprises:
   (a) mounting on a molding form in a shape of said garment so as to cover and contact the side circumferential surface of said molding form, a tubular non-full-fashioned knitted fabric opened at both ends, at least 30% of said fabric being composed of a thermoplastic synthetic fiber;
   (b) tensioning said knitted fabric in the direction of its open ends only to thereby decrease the size of said tubular knitted fabric in the direction of diameter until said fabric fits to the side circumferential surface of said molding form;
   (c) heat-setting the tubular knitted fabric under the application of said tension; and
   (d) thereafter removing the molded fabric from said molding form.

2. The method of Claim 1, wherein the circumferential surface at the transverse section of said tubular knitted fabric is longer than the minimum circumferential length of the molding form and is not more than 4 times said minimum circumferential length.

3. The method of Claim 1, wherein before or after the mounting of the knitted fabric on the molding form, that part of the knitted fabric which covers a curved surface ranging from the neck to the shoulder of the molding form is subjected to dart treatment so that to fit it to the molding form.

References Cited

UNITED STATES PATENTS

| | | | |
|---|---|---|---|
| 3,527,858 | 9/1970 | Braxton et al. | 264—324 |
| 3,655,858 | 4/1972 | Wincklhofer et al. | 264—324 |
| 3,673,611 | 7/1972 | Cain et al. | 264—324 |

ROBERT F. WHITE, Primary Examiner

T. E. BALHOFF, Assistant Examiner

U.S. Cl. X.R.

264—231, 324

UNITED STATES PATENT OFFICE
CERTIFICATE OF CORRECTION

Patent No. __3,819,638__  Dated __June 25, 1974__

Inventor(s) __Kiyoshi OGAWA ET AL__

It is certified that error appears in the above-identified patent and that said Letters Patent are hereby corrected as shown below:

In the Heading, cancel "Claims priority, application Japan, Oct. 10, 1970, 45/92,212" and substitute the following:

-- Claims priority, application Japan, Oct. 20, 1970, 45/92,212; application Japan, Dec. 25, 1970, 45/117,538; application Japan, Dec. 26, 1970, 45/129,794; application Japan, Mar. 15, 1971, 46/14,261; application Japan, Mar. 16, 1971, 46/14,628. --

Signed and sealed this 7th day of January 1975.

(SEAL)
Attest:

McCOY M. GIBSON JR.
Attesting Officer

C. MARSHALL DANN
Commissioner of Patents